United States Patent [19]

Bauer

[11] Patent Number: 4,997,998
[45] Date of Patent: Mar. 5, 1991

[54] KEY CAP FOR A KEYBOARD

[75] Inventor: Karl-Heinz Bauer, Bad Neustadt/Saale, Fed. Rep. of Germany

[73] Assignee: Preh, Elektrofeinmechandische Werke Jakob Preh, Nachf. GmbH & Co., Bad Neustadt/Saale, Fed. Rep. of Germany

[21] Appl. No.: 262,648

[22] Filed: Oct. 26, 1988

[30] Foreign Application Priority Data

Oct. 26, 1987 [DE] Fed. Rep. of Germany ....... 3736116

[51] Int. Cl.$^5$ ........................................... H01H 13/70
[52] U.S. Cl. .................................... 200/345; 200/343; 200/315; 29/622
[58] Field of Search ............... 200/345, 343, 341, 314, 200/517; 264/242, 275, 252, 278; 116/279, 226, 279, 281, 284; 235/145 R, 145 A; 250/465.1; 29/622; 364/708, 709.01

[56] References Cited

U.S. PATENT DOCUMENTS

| 3,627,935 | 12/1971 | Splevak . | |
| 3,829,646 | 8/1974 | Lorteije et al. . | |
| 3,964,594 | 6/1976 | Gabbrielli et al. | 235/145 A |
| 4,302,647 | 11/1981 | Kandler et al. | 200/314 |
| 4,343,975 | 8/1982 | Sado | 200/317 |
| 4,360,722 | 11/1982 | Georgopulos | 200/517 |
| 4,423,299 | 12/1983 | Gurol et al. | 200/512 |
| 4,459,256 | 7/1984 | Ziegler | 264/242 |
| 4,472,610 | 9/1984 | Fuller et al. | 200/343 |
| 4,794,215 | 12/1988 | Sawada et al. | 200/345 |
| 4,843,197 | 6/1989 | Kojima et al. | 200/516 |

FOREIGN PATENT DOCUMENTS

| 1165129 | 3/1964 | Fed. Rep. of Germany . |
| 2623229 | 3/1977 | Fed. Rep. of Germany . |
| 3305556 | 9/1984 | Fed. Rep. of Germany . |
| 34218821 | 12/1985 | Fed. Rep. of Germany . |

Primary Examiner—Henry J. Recla
Assistant Examiner—Glenn T. Barrett
Attorney, Agent, or Firm—Fish & Richardson

[57] ABSTRACT

A key cap of a keyboard is guided at a frame 2, covers a switching element 4 and a luminous element 5 and is provided with an operation section for the switching element 4 and with a transparent symbol zone 18 before the luminous element 5. The key cap consists of a flexible, transparent flat foil 8 fixed with a marginal section 9 at a frame 2. As operation section a body 15 is injection-moulded to the foil 8 at a distance from the marginal section 9. The foil 8 forms a joint section 21 between the marginal section 9 and the body 15, the printed symbol zone 18 being provided for between the body 15 and the joint section 21.

13 Claims, 3 Drawing Sheets

KEY CAP FOR A KEYBOARD

BACKGROUND OF THE INVENTION

The invention relates to a key cap for a keyboard with a frame forming a chamber wherein a switching element and a luminous element are installed, the key cap being guided at the frame, covering the chamber and being provided with an operation section for the switching element and a transparent symbol zone before the luminous element.

Such key caps are known. The known key caps are plastic injection-moulded parts. By means of a multi-colour moulding method, for example, a transparent symbol zone is created on the key cap. Changing the symbol zone during the production is complicated, because the injection-moulding instruments have to be changed. In addition, the transparency in the symbol zone is reduced by the necessary thickness of the injection-moulded plastic.

It is also known to injection-mould a transparent window into the key cap and to print a symbol on its front. The printing of such windows is complicated in production. Furthermore, the print on the front side does not resist persistently against the stress that has to be taken into consideration.

It is also known to insert printed or moulded window parts in the key cap. The production of such window parts is complicated as well. In addition, the mounting of the window part on the key cap complicates the production. With the keyboard described in the DE-OS 26 23 229 the key cap is formed by a foil with symbols printed on its face. A transparent symbol zone is not provided for. Furthermore, the foil itself forms the operation section with its surface. This is often undesired for key operation, since the user has difficulties in finding the operation section sensorially which is especially unfavourable when operating the keyboard in the dark. Similar key caps are also described in DE-AS 1 165 129 and U.S. Pat. No. 3,627,935.

SUMMARY OF THE INVENTION

It is an object of the invention to provide a key cap of the type described above which can be adapted easily to the desired design of the operation section and of the symbol zone during production.

According to the invention, this object is achieved by the fact that the key cap is formed of a flexible, transparent flat foil, that one marginal section of the foil is fixed to the frame, that a body functioning as operation section is integrally injection-moulded to the foil at a distance from the marginal section, that the foil forms a joint section between the marginal section and the body and that near the body the foil is provided with a symbol zone where the foil is printed.

With such a key cap the design of the operation section can be adapted specifically to the respective aim by a corresponding injection-moulding instrument without having to change the construction of the foil further. In addition, the design of the symbol zone can be adapted to one's wishes without having to change the form of the body forming the operation section for this purpose. For example, it is therefore easy to adapt the symbols to the respective device or its circle of operators during production.

When the key cap is used, it is an advantage that the body forming the operation section can be easily sensed and found by the operator and that said body resists persistently against stress.

It is a further advantage that the symbol zone is of high transparency so that symbols of different colour can be printed as well. Even a luminous element of small luminosity is sufficient in order to illuminate the symbol zone. Since the foil can be printed easily from its back, the symbols are protected against stress and wear from the front.

Another advantage of the described construction of the key cap is that it has only a small depth so that very flat keyboards can be constructed.

It is also favorable that the foils forming the key caps do not have to be printed individually but can be printed on a tape or on surface units.

The described key caps can be used with keyboards in motor vehicle electronics, in consumer electronics or with computer keyboards, for example.

Further favorable embodiments of the invention result from the following description of embodiments.

DETAILED DESCRIPTION OF THE INVENTION

Figure 1:
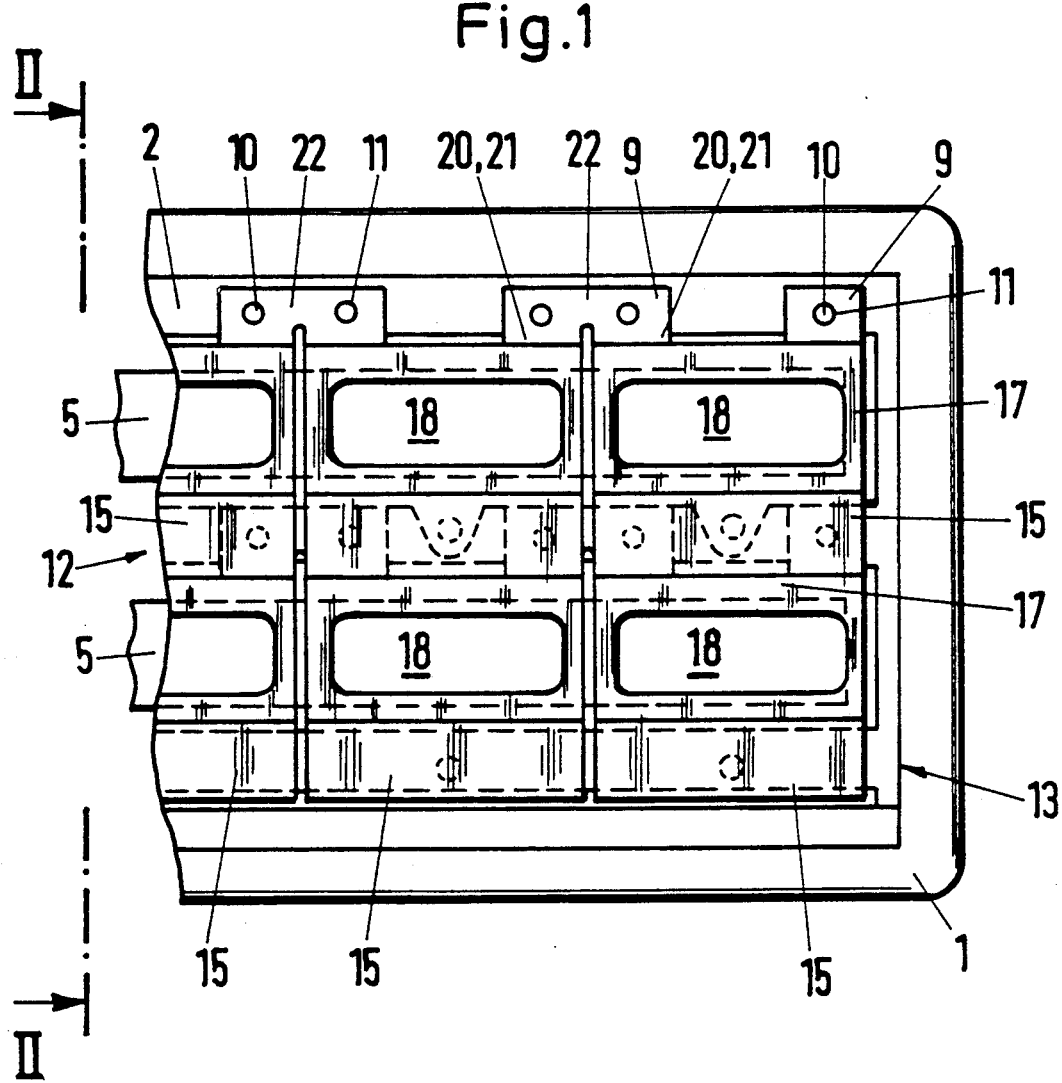
FIG. 1 shows a view of a keyboard with two rows of key caps.

In a basic frame 1 a set-in frame 2 is inserted. The basic frame 1 and the set-in frame 2 form chambers 3. In each chamber 3 a switching element 4 and a luminous element 5 are arranged.

The switching element 4 is provided with an elastic switching dome 6 below which electric contacts are arranged and which engages a switching tappet 7 guided in the basic frame 1.

The luminous element 5 is formed by a light guide. The light guides of the chamber 3 are connected with each other and are illuminated by a common light source.

Each chamber 3 is covered by a flexible, transparent foil 8. The foil 8 is provided with a marginal section 9 by which it is fixed to the set-in frame 2. For this purpose the set-in frame 2 is provided with pivots 10 over which the foil 8 with holes 11 of marginal section 9 is plugged.

In the illustrated embodiment two rows 12, 13 of key caps are provided for. The marginal sections 9 of the upper row 12 of the key caps are covered by a strip 14, which is not shown in FIG. 1.

As the operation section a body 15 is integrally moulded to the foil's edge opposite the marginal section 9. This body 15 may be rippled or milled to increase friction between the body 15 and the user's fingers. At its inner side a projection 16 protrudes resting on the switching tappet 7.

Body 15 and border (or frame) 17 are integrally molded onto foil 8 so that the edge of the foil is clamped and held by the border, leaving the foil 8 visible in a window-like symbol zone. The symbol zone 18 is located in front of the luminous element 5. In the symbol zone 18 the flexible, transparent foil 8 is provided with a print 19 at its side facing the luminous element 5, especially with a screen print forming the respective symbol and/or the respective colour design. The print 19 can be designed such that the symbol zone 18 appears in a different colour in daylight than in the dark when mainly the luminous element 5 is effective.

Between the border 17 and the set-in frame 2 there is a gap 20 bridged by the foil 8. Here the foil 8 forms a joint section 21 which renders possible the movement of the key cap. The border 17 serves not only as an optical demarcation of the symbol zone 18, but achieves simultaneously a stiffening of the foil 8 in the section of the symbol zone 18 between the joint section 21 and the body 15.

The body 15 is designed such that it covers the marginal section 9 of the adjacent foil 8 of the lower row 13 where said foil is fixed at pivots 10.

Preferably, the foils 8 associated to the individual chambers 3 are not produced as individual parts but as a tape. The foils 8 of the upper row 12 and the lower row 13 are printed in the symbol zone on a tape. Subsequently, the foils 8 associated to the individual chambers 3 are punched out, the foils 8 remaining connected with each other in the marginal section 9 which serves as a support. These points are marked as 22 in FIG. 1. In addition, the holes 11 are punched and the bodies 15 are injection-moulded with the borders 17 in a tape-like piece.

Then the foils 8 of the upper row 12 and the lower row 13 are pressed onto the pivots 10. Thus, they are fixed to the set-in frame 2 and adjusted in a simple way in the right position in relation to the chambers 3.

When a key cap is operated, its bodies 15 rising above the symbol zone 18 are pressed. The joint section 21 allows for a swivel such that the switching tappet 7 presses down the switching dome 6. The restoring force for the foil 8 is provided by the switching dome 6. The fact that there is the symbol zone 18 between the joint section 21 and the body 15 renders possible a sufficient switching stroke of the key cap.

In order to avoid swivelling of the foil 8 too far out of the basic frame 1, hooks 25 limiting the swivel range can be arranged at the body 15.

Figure 2:
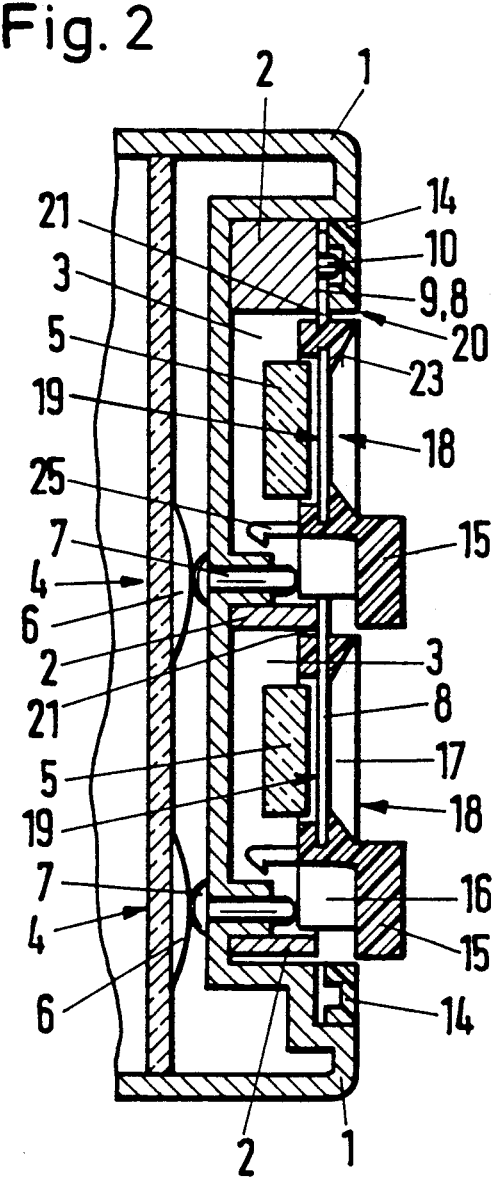
FIG. 2 shows a sectional view along line II—II according to FIG. 1.
Figure 3:
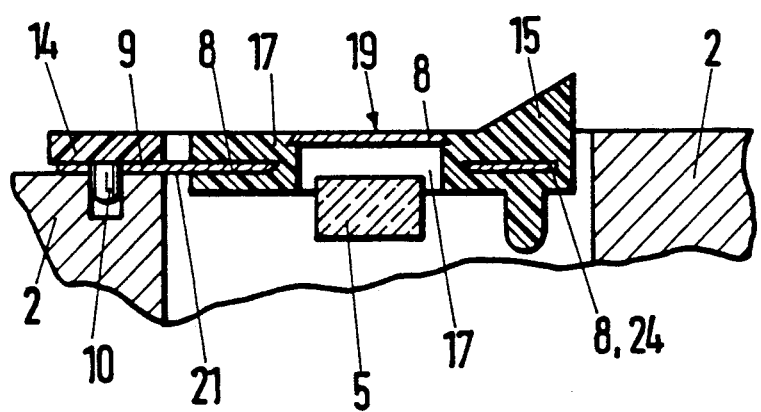
FIG. 3 shows a sectional view of another embodiment of a key cap.

In the embodiment according to FIG. 2 the foil 8 is placed in the symbol zone 18 opposite the strip 14 or the border 17, respectively, said border 17 running with slopes 23 towards the foil 8. In the embodiment according to FIG. 3, however, the foil 8 extends flush with the strip 14 in the symbol zone 18. For this purpose the foil 8 is pressed ahead in the symbol zone 18 by means of a piston when the border 17 and the body 15 are injection-moulded. Preferably, the foil 8 is cut free during this process. Then the border 17 forms the connection between the joint section 21 and the symbol zone 18 as well as a foil portion 24 extending in the body 15.

In another embodiment of the invention the injection-moulded border 17 might be missing. In this case the optical demarcation of the symbol zone 18 might be provided by corresponding printing on the foil 8.

The foils 8 do not have to be separated between the individual chambers 3 and/or the individual rows 12, 13. A foil can extend continuously over several chambers 3 or rows 12, 13, respectively. Then said foil 8 is provided with holes in the section of the bodies 15 in order to fix the bodies to the foil 8.

What is claimed is:

1. A multiple key cap for a keyboard, the keyboard having a frame forming a plurality of chambers with a luminous element and a switching element disposed in each chamber, said multiple key cap comprising:

a transparent foil covering the plurality of chambers, said foil having a marginal section for attachment to the frame of the keyboard and a symbol zone corresponding to each one of the chambers;

a plurality of bodies, each body being mounted at a portion of said foil spaced from said marginal section corresponding to one of the chambers and protruding outwardly from said foil, each said body having a touch body portion; and wherein said foil includes a joint section corresponding to each chamber, each said joint section being formed between said marginal section and said portion spaced from said marginal section, so that said touch body portions are pivotable to operate the switching elements.

2. A multiple key cap as in claim 1, wherein each said symbol zone is disposed between said corresponding joint section and said corresponding touch body.

3. A multiple key cap as in claim 1, wherein said body further comprises an inwardly extending shoulder for contacting a switching tappet of the switching element.

4. A multiple key cap as in claim 1, wherein said symbol zone of said foil has an outwardly facing surface and an inwardly facing surface and is printed on said inwardly facing surface.

5. A multiple key cap as in claim 1, wherein said body include an injection molded border surrounding each of said symbol zones.

6. A multiple key cap as in claim 1, wherein said foil is flat.

7. A multiple key cap as in claim 1, wherein said foil extends outwardly in said symbol zone.

8. A multiple key cap as in claim 1, wherein said foil is formed of a plurality of foil tapes, with a single said foil tape corresponding to a row of chambers.

9. A keyboard as in claim 8, wherein said chambers are formed in at least two separate rows, each row of chambers being covered by a separate strip of said transparent foil.

10. A keyboard as in claim 8, wherein said switching elements provide a restoring force to the corresponding key caps.

11. A keyboard as in claim 8, wherein each said switching element includes a switching tappet and said body includes a inwardly projecting shoulder corresponding to each said tappet for actuating said tappet.

12. A keyboard comprising:

a frame having a plurality of chambers formed therein;

a switching element and a luminous element disposed in each of said chambers;

a transparent foil covering said plurality of chambers to form key caps over each chamber, said foil having a marginal section attached to said frame and a symbol zone corresponding to each one of the chambers;

a plurality of bodies, each body being integrally injection-molded to a portion of said foil spaced from said marginal section corresponding to one of the chambers and protruding outwardly from said foil, and each said body having a touch body portion; and wherein said foil includes a joint section corresponding to each chamber, each said joint section being formed between said marginal section and said portion spaced from said marginal section, so that said touch body portions are pivotable to operate the switching elements.

13. A keyboard comprising:

a frame having a plurality of chambers formed therein;

a switching element and a luminous element disposed in each of said chambers;

a transparent foil covering said plurality of chambers to form key caps over each chamber, said foil having a marginal section attached to said frame and a symbol zone corresponding to each one of the chambers;

a plurality of bodies, each body being integrally injection-molded to a portion of said foil spaced from said marginal section corresponding to one of the chambers and protruding outwardly from said foil, and each said body having a touch body portion; and wherein said foil includes a joint section corresponding to each chamber, each said joint section being formed between said marginal section and said portion spaced from said marginal section, so that said touch body portions are pivotable to operate the switching elements and wherein each foil extends outwardly in said symbol zone;

wherein each said switching element includes a switching tappet and said body includes an inwardly projecting shoulder corresponding to each said tappet for actuating said tappet; and wherein said foil extends outwardly in said symbol zone.

* * * * *